United States Patent
Ha et al.

(10) Patent No.: US 11,042,076 B2
(45) Date of Patent: Jun. 22, 2021

(54) CAMERA MODULE WITH HEATING ELEMENT

(71) Applicant: SAMSUNG ELECTRO-MECHANICS CO., LTD., Suwon-si (KR)

(72) Inventors: Joo Young Ha, Suwon-si (KR); Sang Hyo Seo, Suwon-si (KR); Dae Seob Kim, Suwon-si (KR); Cheong Hee Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 257 days.

(21) Appl. No.: 16/136,397

(22) Filed: Sep. 20, 2018

(65) Prior Publication Data

US 2019/0137850 A1    May 9, 2019

(30) Foreign Application Priority Data

Nov. 7, 2017  (KR) .................. 10-2017-0147443

(51) Int. Cl.
*G03B 17/55* (2021.01)
*G02B 7/02* (2021.01)

(52) U.S. Cl.
CPC ............ *G03B 17/55* (2013.01); *G02B 7/021* (2013.01); *G02B 7/028* (2013.01)

(58) Field of Classification Search
None
See application file for complete search history.

(56) References Cited

U.S. PATENT DOCUMENTS 5,562,972 A * 10/1996 Sasaki .................. C03C 8/18
174/257
9,961,722 B2    5/2018 Chae et al.
(Continued)

FOREIGN PATENT DOCUMENTS

CN    204883138 U    12/2015
CN    106560742 A    4/2017
(Continued)

OTHER PUBLICATIONS

Korean Office Action dated May 27, 2019 in corresponding Korean Patent Application No. 10-2017-0147443 (8 pages in English, 6 pages in Korean).
(Continued)

*Primary Examiner* — Robert E. Tallman
(74) *Attorney, Agent, or Firm* — NSIP Law

(57) ABSTRACT

A camera module includes an upper housing coupled to a lower housing to form an inner space, a lens module provided in the inner space and including a heating element, and a substrate configured to supply power to the heating element, wherein the lens module includes an inner barrel comprising one or more lenses, an outer barrel which is coupled to a portion of the inner barrel in an optical axis direction, and a holder in which the outer barrel is fixed, wherein the substrate is fixed to a portion of the holder, wherein the heating element is disposed between the inner barrel and the outer barrel, and is connected to the substrate by a power connection line, and wherein the power connection line is connected to the substrate through a coupling hole in the holder.

20 Claims, 13 Drawing Sheets

(56) References Cited

U.S. PATENT DOCUMENTS

| | | | |
|---|---|---|---|
| 10,645,263 B2 | 5/2020 | Choi | |
| 10,684,444 B2 | 6/2020 | Lee et al. | |
| 2017/0099700 A1 | 4/2017 | Chae et al. | |
| 2018/0176431 A1 | 6/2018 | Kim et al. | |
| 2018/0239105 A1* | 8/2018 | Lee | G02B 27/00 |
| 2018/0345911 A1* | 12/2018 | Zurowski | B60S 1/026 |
| 2019/0033690 A1* | 1/2019 | Choi | H04N 5/2252 |

FOREIGN PATENT DOCUMENTS

| | | | |
|---|---|---|---|
| JP | 2004-325603 A | 11/2004 |
| KR | 10-2015-0124197 A | 11/2015 |
| KR | 10-2016-0142627 A | 12/2016 |
| KR | 10-2017-0006724 A | 1/2017 |
| KR | 10-2017-0023664 A | 3/2017 |
| KR | 10-2017-0040672 A | 4/2017 |
| KR | 10-2017-0041360 A | 4/2017 |
| KR | 10-2017-0095613 A | 8/2017 |
| WO | WO 2016/195403 A1 | 12/2016 |
| WO | WO 2017/030351 A1 | 2/2017 |

OTHER PUBLICATIONS

Chinese Office Action dated Oct. 27, 2020 in counterpart Chinese Patent Application No. 201811312727.8 (8 pages in English, 8 pages in Chinese).

\* cited by examiner

CAMERA MODULE WITH HEATING ELEMENT

CROSS-REFERENCE TO RELATED APPLICATION

This application claims benefit under 35 U.S.C. § 119(a) of Korean Patent Application No. 10-2017-0147443 filed on Nov. 7, 2017 in the Korean Intellectual Property Office, the entire disclosure of which is incorporated herein by reference for all purposes.

BACKGROUND

1. Field

This application relates to a camera module with a heating element.

2. Description of Related Art

Generally, the images that are captured in surveillance cameras such as a closed-circuit televisions (CCTV), or similar devices may deteriorate due to changes in the temperature or changes in the surrounding environment. As the demand for vehicle camera systems has increased, and an application of vehicle camera systems has expanded, there is a desire to reduce the deterioration of captured images due to factors such as temperature changes or various aspects of the surrounding environment.

For example, in recent vehicles, cameras such as surround view monitoring (SVM) camera, or similar cameras, as well as rear-view cameras, may be installed for advanced driver assistance systems (ADAS). Additionally, in future applications, a number of cameras with various differing functions will be installed in many vehicles.

In a typical camera, when the temperature is low, such as during the winter season, to prevent the image deterioration phenomenon of the camera, an additional heater may be installed in the camera system. However, installing an additional heater into the camera system may not be advantageous because of restrictions on the size and shape of the camera.

However, as the demand for the vehicle camera systems has increased, the size, shape and structure of camera systems mounted on vehicles should be improved so that the placement of the camera system in the vehicle does not affect the air resistance and the appearance of the vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes an upper housing coupled to a lower housing to form an inner space, a lens module provided in the inner space and including a heating element, and a substrate configured to supply power to the heating element, wherein the lens module includes an inner barrel comprising one or more lenses, an outer barrel which may be coupled to a portion of the inner barrel in an optical axis direction, and a holder in which the outer barrel is fixed, wherein the substrate is fixed to a portion of the holder, wherein the heating element may be disposed between the inner barrel and the outer barrel, and is connected to the substrate by a power connection line, and wherein the power connection line is connected to the substrate through a coupling hole in the holder.

At least a portion of the power connection line may be external to the lens module.

The power connection line may be drawn out to a boundary portion of the lens module at which the inner barrel and the outer barrel are coupled to each other.

The power connection line is drawn out to an external region of the lens module through a drawn-out hole provided in the outer barrel.

A connector to which the power connection line is coupled may be provided on the substrate, and the connector may be exposed to a coupling hole provided in the holder.

The heating element may be formed in a disk shape, and may be fitted between surfaces of the inner barrel and the outer barrel, wherein the surfaces of the inner barrel and the outer barrel may face each other in the optical axis direction.

The heating element may be formed in a cylindrical shape, and may be fitted between surfaces of the inner barrel and the outer barrel, and wherein the surfaces of the inner barrel and the outer barrel may be parallel to the optical axis direction.

The heating element may be formed in a ceramic type in which heating materials are mixed and baked.

The heating element may be configured to have two electrodes on both sides of the heating element or two electrodes on one side of the heating element.

The power connection line may be extended from the two electrodes.

The heating element may be provided in a film-type heating element in which a heating material is deposited or patterned on a film-type substrate.

The heating element may be configured to have two electrodes.

The power connection line may be extended from the two electrodes.

The heating element may be formed from a positive temperature coefficient (PTC) material.

The inner barrel may be formed from a metal material which has a relatively high thermal conductivity.

The heating element may be formed from a positive temperature coefficient (PTC) material.

The inner barrel may be formed from a metal material which has a relatively high thermal conductivity.

The inner barrel may be formed from aluminum.

The heating element may be exposed to an external region of the lens module.

In a general aspect, a camera module includes a lens module which includes an inner barrel, an outer barrel, a heating element disposed between the inner barrel and the outer barrel, and, and a power-supply connection line configured to be drawn out of the lens module to connect the heating element to a power supply source.

The power connection line may be external to the lens module.

The heater may be one of a disk shape or a cylindrical shape.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
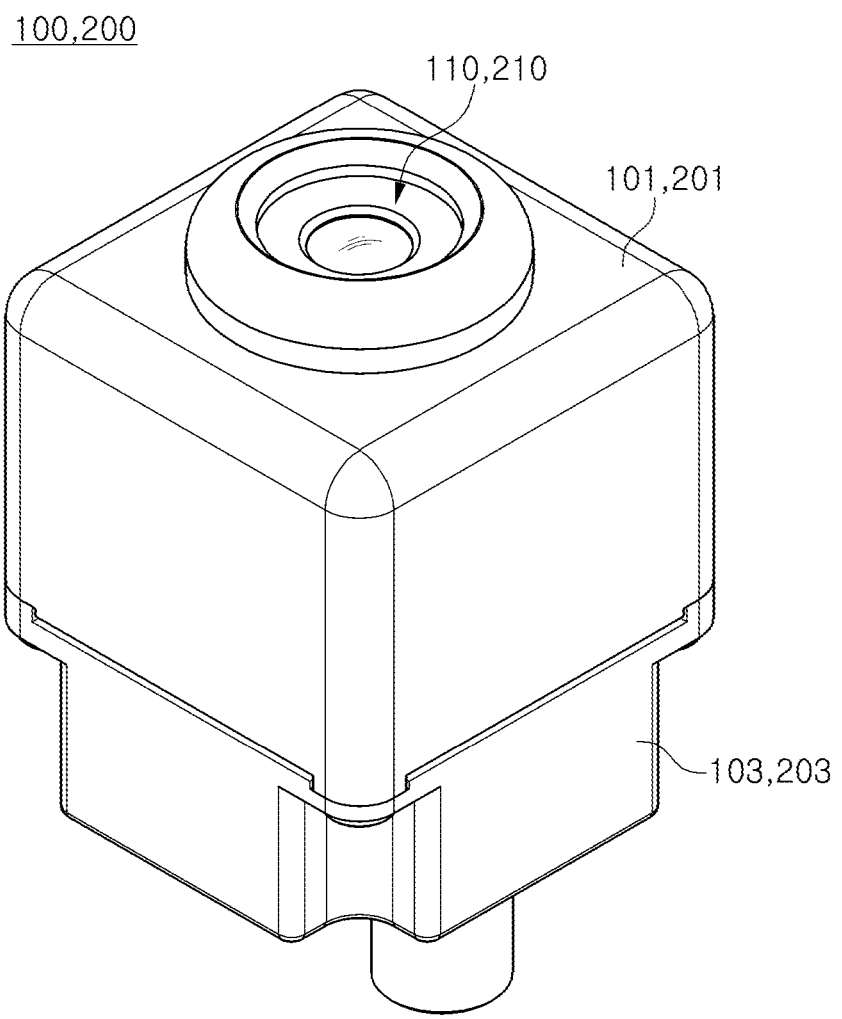
FIG. 1 illustrates an example of an assembled perspective view of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
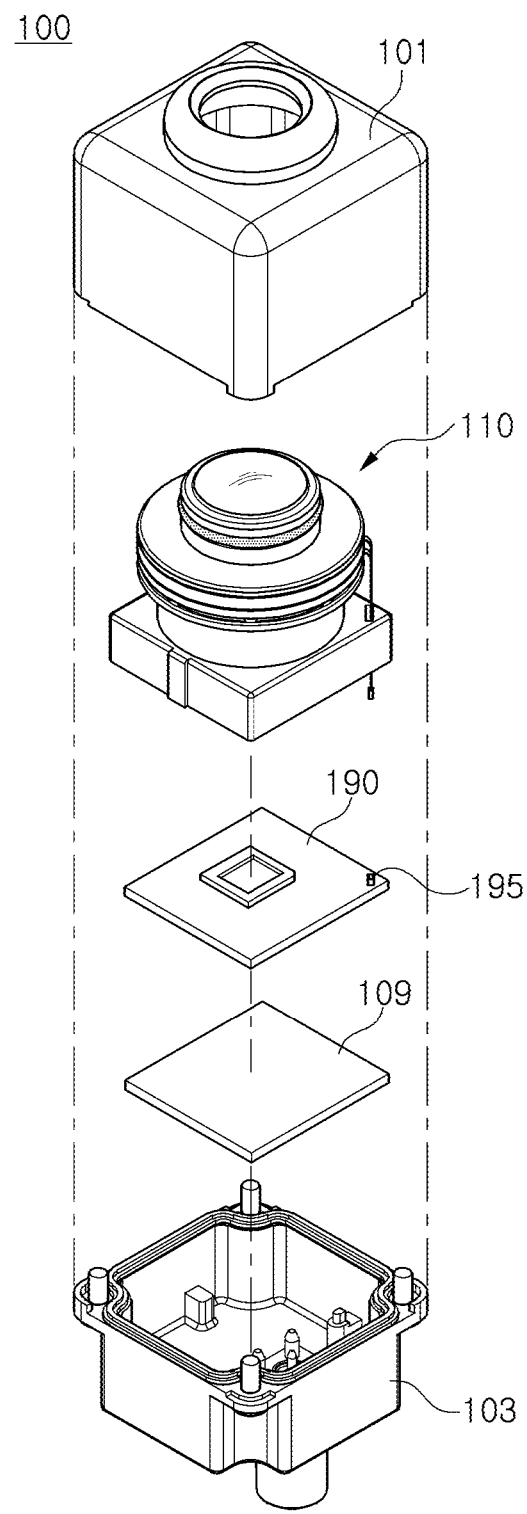
FIG. 2 illustrates a first example of an exploded perspective view of a camera module.
Figure 3:
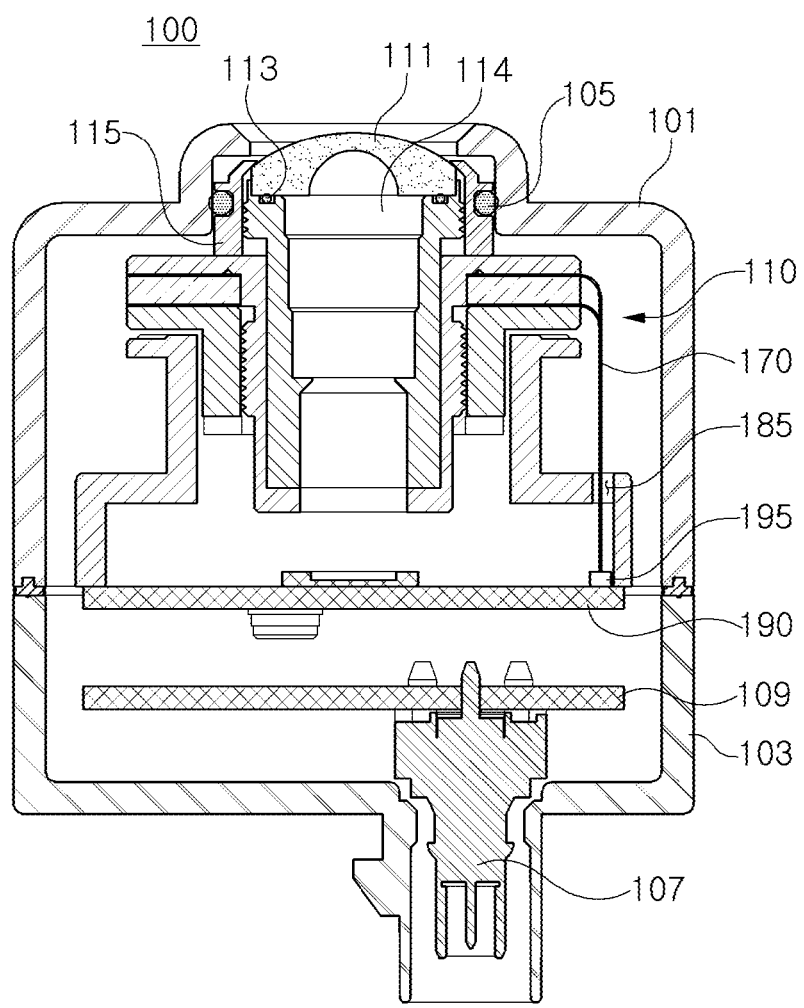
FIG. 3 illustrates an example of an assembled cross-sectional view of a camera module of the example of FIG. 2.
Figure 4:
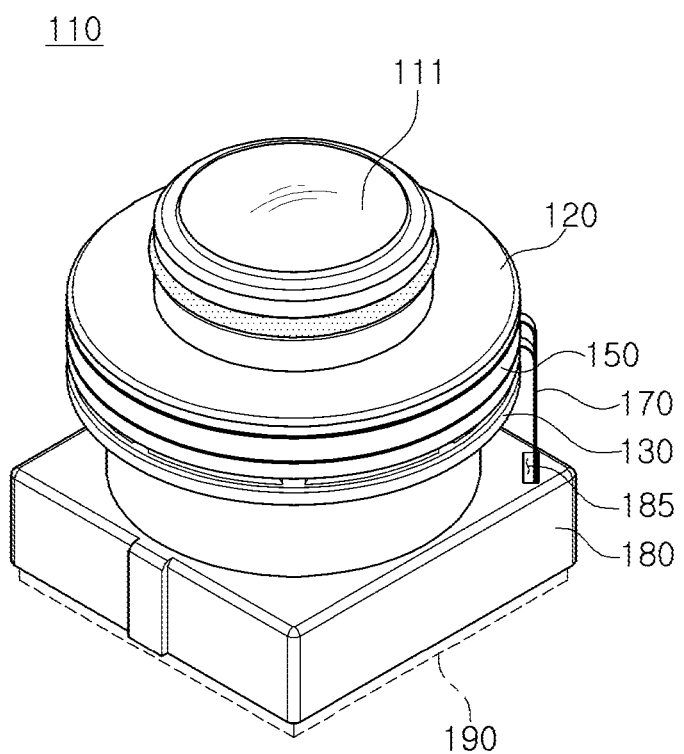
FIG. 4 illustrates an example of an assembled perspective view of a lens module of the camera module of FIG. 2.
Figure 5:
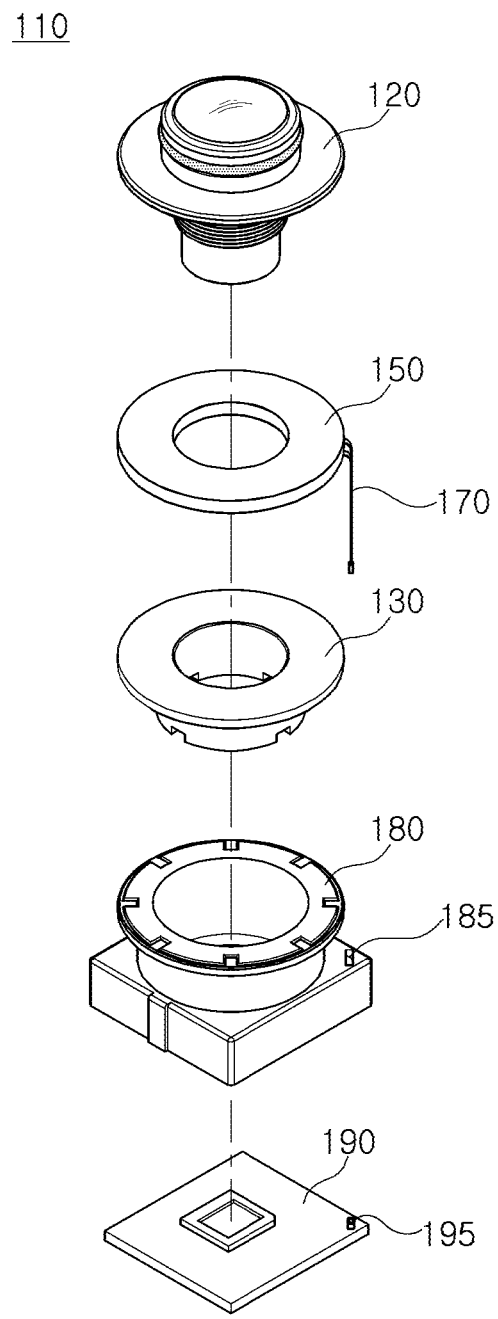
FIG. 5 illustrates an example of an exploded perspective view of a lens module of the camera module of FIG. 2.
Figure 6:
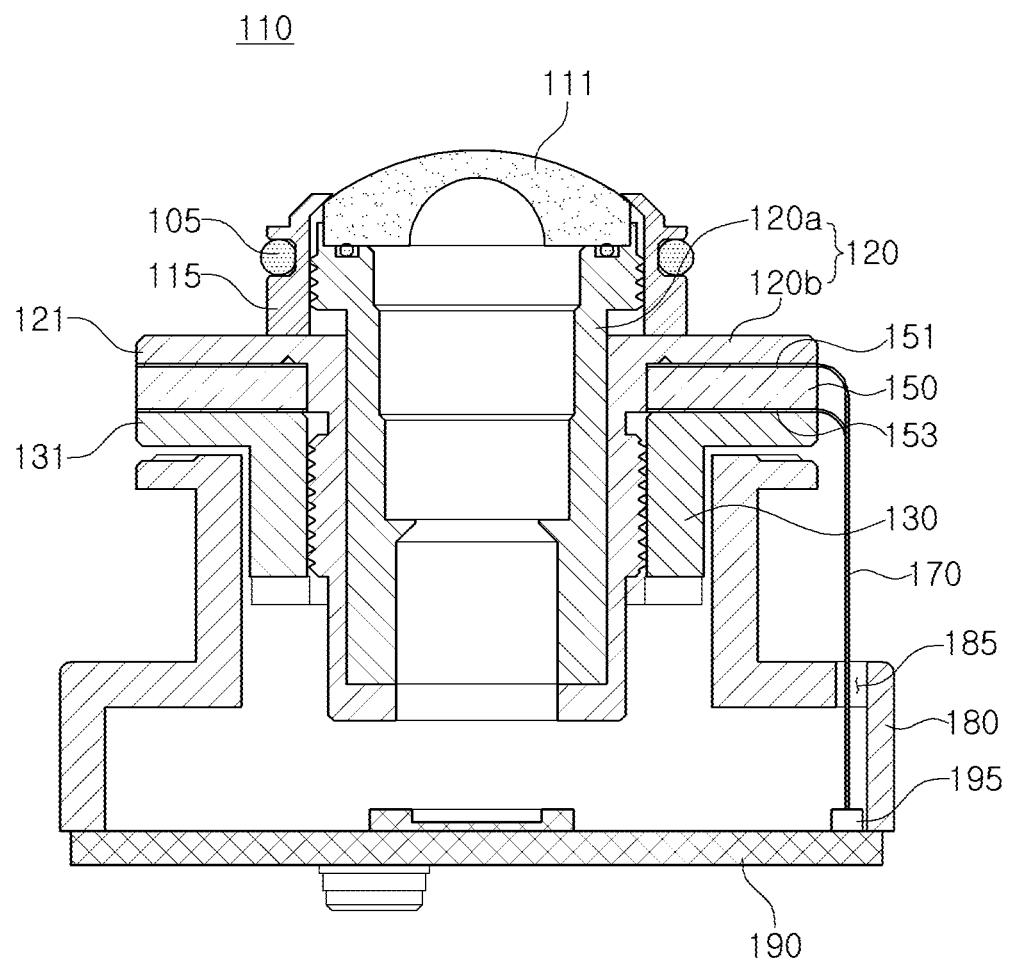
FIG. 6 illustrates an example of an assembled cross-sectional view of a lens module of the camera module of FIG. 2.

FIG. 1 is an example of an assembled perspective view of a camera module, FIG. 2 is an exploded perspective view of a camera module according to the first example, FIG. 3 is an assembled cross-sectional view according to the first example, FIG. 4 is an assembled perspective view of a lens module according to the first example, FIG. 5 is an exploded perspective view of a lens module according to the first example, and FIG. 6 is an assembled cross-sectional view of a lens module according to the first example.

Referring to FIGS. 1 and 2, a camera module 100 according to the present example includes an upper housing 101, a lower housing 103, a lens module 110 provided in an inner space formed by coupling the upper housing 101 and the lower housing 103, and a substrate 190 connected to the lens module 110 by a power connection line 170 (discussed below with regard to FIG. 3).

Referring to FIG. 3, a cover glass 111 may be provided at an upper end portion of the lens module 110, a sealing member 113 made of a material such as silicone, rubber, or similar materials may be interposed between the cover glass 111 and the lens module 110 to reinforce a sealing force. The cover glass 111 may be tightly coupled by an additional member 115 that may be screw-coupled to the lens module 110.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

In addition, a sealing member 105 (FIG. 3) made of a material such as silicone, rubber, or similar types of materials may be interposed between the lens module 110 and the upper housing 101 to reinforce a sealing force.

On the other hand, a connector 107 may be provided at a lower end portion of the lower housing 103 for power connection or control connection. Additionally, a main substrate 109 and a substrate 190 may be provided in the lens module 110.

Referring to FIGS. 3 to 6B, the lens module 110 according to the first example may include an inner barrel or housing 120, an outer barrel or housing 130, a heating element 150, a power connection line 170, and a holder 180.

The inner barrel 120 may have one or more lenses 114 stacked therein, and a cover glass 111 may be coupled to an upper end portion. An additional member 115 may also be fixed to the upper end portion of the inner barrel 120 in a screw-coupled manner to fix the cover glass 111.

The inner barrel 120 may include a first inner barrel 120a into which a lens is inserted and a second inner barrel 120b coupled to an outer side of the first inner barrel 120a, and the first inner barrel 120a and the second inner barrel 120b may be provided with separate members mutually coupled or integrally formed.

Additionally, the inner barrel 120 may be provided with a first coupling flange 121 (FIG. 6) protruding in a direction perpendicular to an optical axis direction in such a manner that the heating element 150 may be insertedly fitted as described below. The first coupling flange 121 may be provided in a disk shape. The first coupling flange 121 may be provided in a disk shape, but is not limited thereto. Since the heating element 150 may be provided outside of the inner barrel 120, the inner barrel 120 may be provided with a material formed of a metal material having relatively high thermal conductivity, such as, for example, aluminum Al, or similar materials which have high thermal conductivity. Non-metal materials such as plastic, or similar materials, may be used in addition to metal materials.

The outer barrel 130 may be coupled to a lower portion of the inner barrel 120 in the optical axis direction by screw-coupling or bonding-coupling. The coupling may be achieved by using an adhesive, but is not limited thereto. A thread may be provided in the inner barrel 120 and the outer barrel 130 to be mutually screw-coupled for screw-coupling.

Further, the outer barrel 130 may have a second coupling flange 131 protruding in a direction perpendicular to an optical axis direction in such a manner that the heating element 150 is to be insertedly fitted described below. The second coupling flange 131 may be provided in a disk shape, but is not limited thereto.

The heating element 150 may be coupled between the inner barrel 120 and the outer barrel 130 in a state of being insertedly fitted therebetween. The heating element 150 may be provided in a form of a disk (discus type or donut type), and may be insertedly fitted between surfaces of the inner barrel 120 and the outer barrel 130, facing each other in an optical axis direction.

The first coupling flange 121 may be provided in the inner barrel 120 and the second coupling flange 131 may be provided in the outer barrel 130 to firmly fix the heating element 150 provided in a disk shape, and the heating element 150 may be insertedly fitted and coupled between surfaces of the first coupling flange 121 and the second coupling flange 131 in an optical axis direction. The heating element 150 may have roughly the same shape as the first coupling flange 121 and the second coupling flange 131.

In an example, an inner end portion of the heating element 150, in other words, an inner perimeter portion may be in contact with an outer side surface of the inner barrel 120, and an outer end portion, in other words, an outer perimeter portion may be exposed to an outside of the lens module 110.

The heating element 150 may be connected to a substrate 190 and by a power connection line 170 to receive power. The power connection line 170 may be extended from the heating element 150 and exposed to the outside of the lens module 110, and may be connected to a connector 195 of the substrate 190 penetrating through the holder 180.

The holder 180 may be fixedly coupled to an outer surface of the outer barrel 130. An upper end portion of the holder 180 may be hooked on a lower surface of the second coupling flange 131 of the outer barrel 130. The holder 180 and the outer barrel 130 may be screw-coupled or fixed by bonding-coupling using an adhesive. A thread may be provided in the outer barrel 130 and the holder 180 and may be mutually screw-coupled for screw-coupling.

A coupling hole 185 may be provided to expose the connector 195 provided on the substrate 190 in the holder 180. The power connection line 170 may be connected to the connector 195 through the coupling hole 185.

Additionally, the substrate 190 may be fixedly coupled to the lower portion of the holder 180. The substrate 190 may be screw-coupled such that the connector 195 is exposed through the coupling hole 185 or bonding-coupled with an adhesive.

Figure 7:
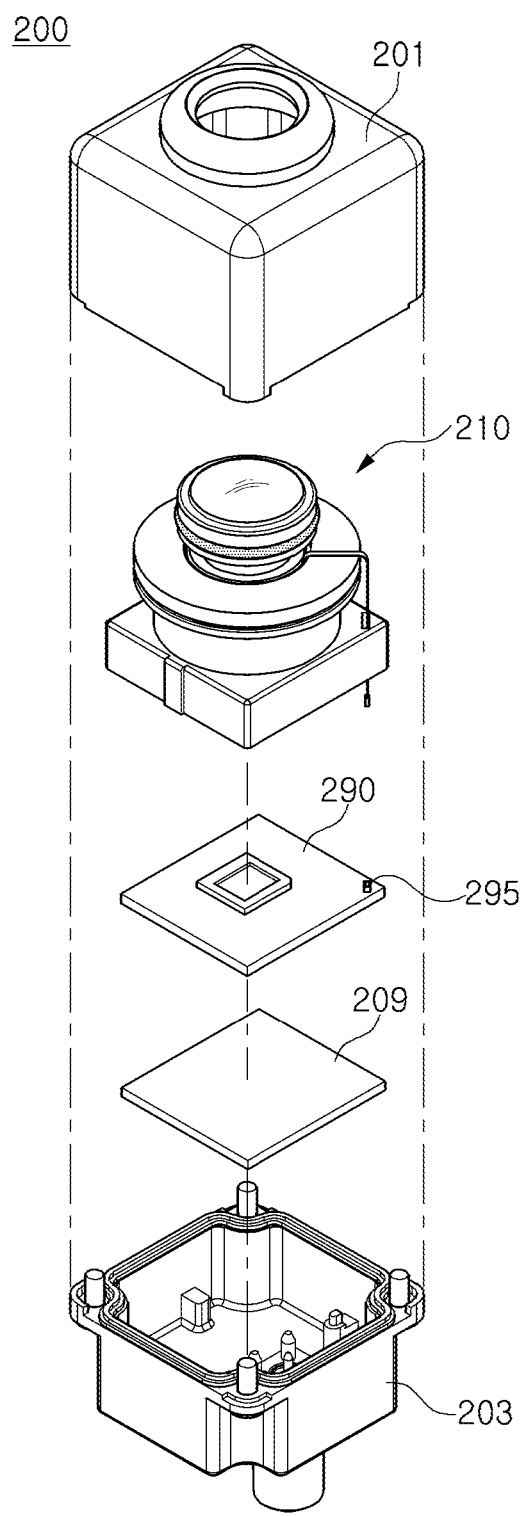
FIG. 7 illustrates an example of an exploded perspective view of a camera module.
Figure 8:
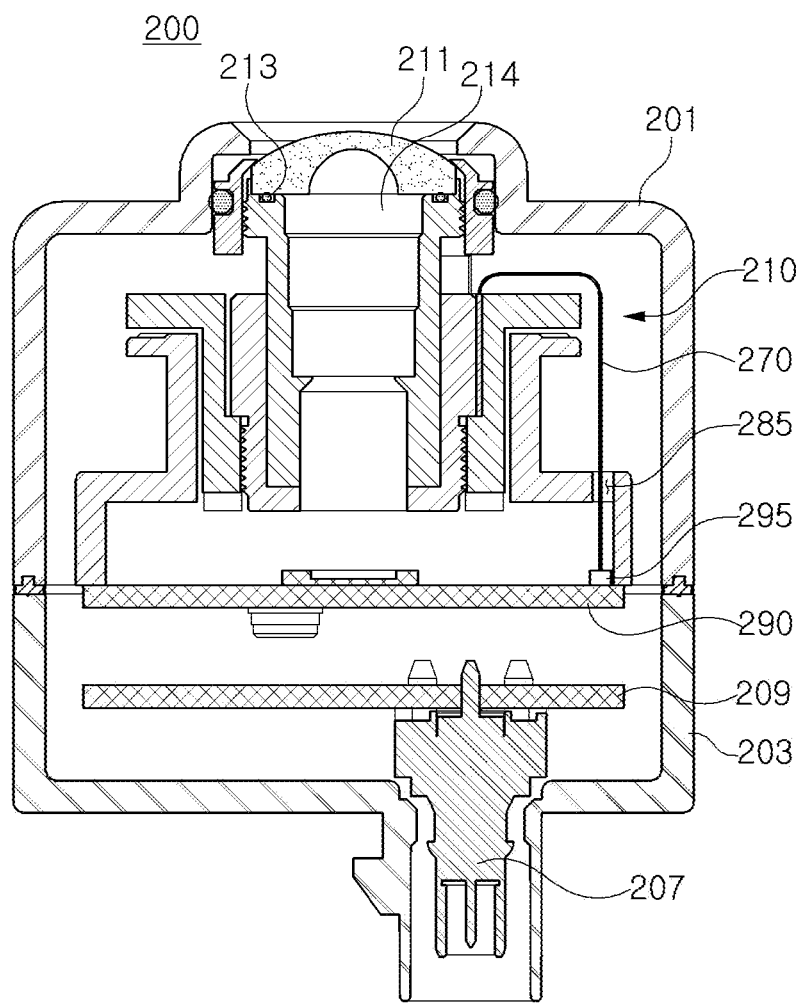
FIG. 8 illustrates an example of an assembled cross-sectional view of the camera module of FIG. 7.
Figure 9:
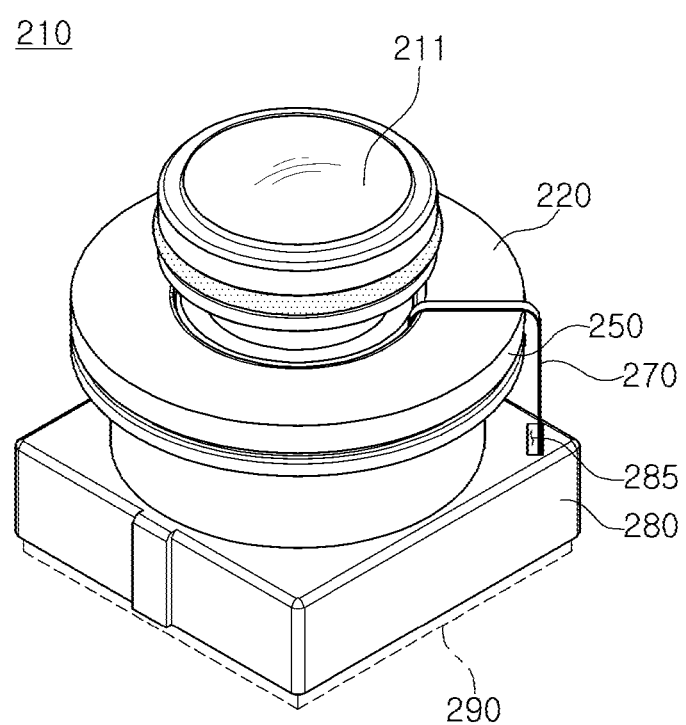
FIG. 9 illustrates an example of an assembled perspective view of a lens module of the camera module of FIG. 7.
Figure 10:
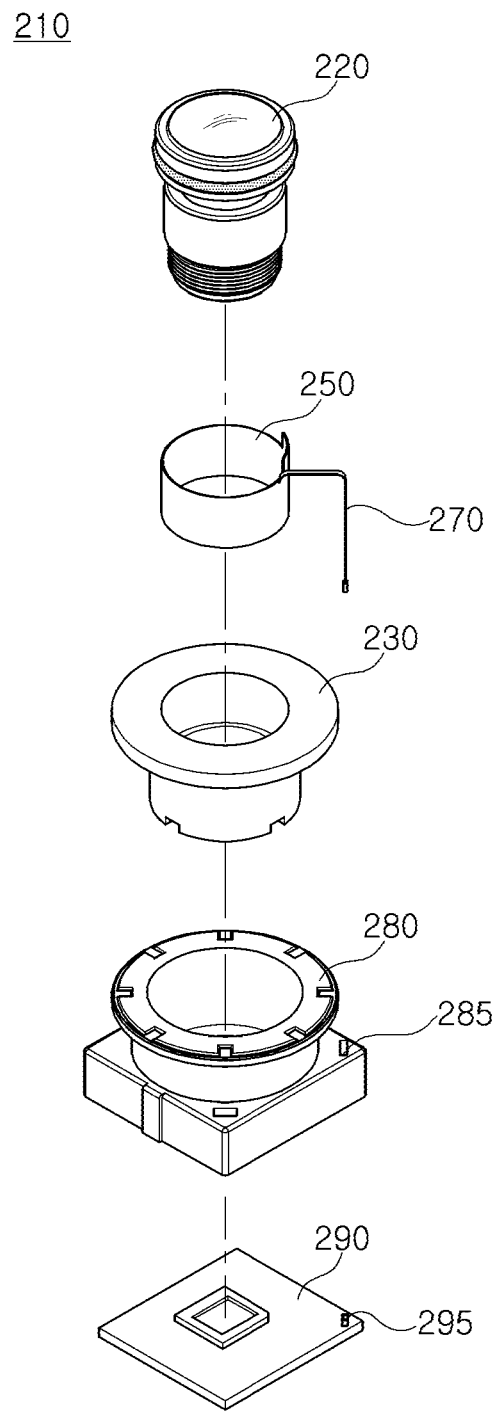
FIG. 10 illustrates an example of an exploded perspective view of a lens module of the camera module of FIG. 7.

FIG. 1 is an assembled perspective view of a camera module according to a first example, FIG. 7 is an exploded perspective view of a camera module according to a second example, FIG. 8 is an assembled cross-sectional view of the second example, FIG. 9 is an assembled perspective view of a lens module according to the second example, FIG. 10 is an exploded perspective view of a lens module according to the second example, and FIG. 11 is an assembled cross-sectional view of a lens module according to the second example.

Referring to FIGS. 1 and 7, a camera module 200 according to a second example includes an upper housing 201, a lower housing 203, a lens module 210 provided in an inner space or cavity formed by coupling the upper housing 201 and the lower housing 203, and a substrate 290 connected to a lens module 210 by a power connection line 270 (FIG. 8).

A cover glass 211 may be provided at an upper end portion of the lens module 210, and a sealing member 213 made of a material such as silicone, rubber, or the like may be interposed between the cover glass 211 and the lens module 210 to reinforce a sealing force. The cover glass 211 may be tightly coupled by an additional member 215 (FIG. 11A) that may be screw-coupled to the lens module 210.

Additionally, a sealing member 205 (FIG. 11A) that may be made of a material such as silicone, rubber, or a similar material may be interposed between the lens module 210 and the upper housing 201 to reinforce a sealing force.

On the other hand, a connector 207 may be provided at a lower end portion of the lower housing 203 for power connection or control connection. Additionally, a main substrate 209 and a substrate 290 may be provided in the lens module 210.

Referring to FIGS. 8 to 11, a lens module 210 according to a second example may include an inner barrel 220, an outer barrel 230, a heating element 250, a power connection line 270, and a holder 280.

The inner barrel 220 may have at least one lens 214 stacked therein, and a cover glass 211 may be coupled to an upper end portion. An additional member 215 may also be fixed in a screw-coupled manner to the upper end portion of the inner barrel 220 to fix the cover glass 211.

The inner barrel 220 may include a first inner barrel 220a into which a lens is inserted and a second inner barrel 220b coupled to an outer side of the first inner barrel 220a, and the first inner barrel 220a and the outer barrel 220b may be provided with separate members mutually coupled or integrally formed.

Further, the inner barrel 220 may be provided in a cylindrical shape in such a manner that the heating element 250 may be insertedly fitted as described below. Since the heating element 250 may be provided outside of the inner barrel 220, the inner barrel 220 may be formed of a metal material having relatively high thermal conductivity. For example, aluminum AL, or similar materials which have high thermal conductivity may be used. Non-metal materials such as plastic, or similar materials may be used in addition to the metal material.

The outer barrel 230 may be coupled to the lower portion of the inner barrel 220 in the optical axis direction by screw-coupling or bonding-coupling using an adhesive. A thread may be provided to mutually screw-coupled in the inner barrel 220 and the outer barrel 230 for screw-coupling.

In addition, the outer barrel 230 may be provided in a long cylindrical shape in the optical axis direction in such a manner that the heating element 250 is to be insertedly fitted to the inner surface as described below. To facilitate coupling of the holder 280 described below, a third coupling flange 231, which protrudes in a direction perpendicular to the optical axis direction, may be provided.

The heating element 250 may be coupled between the inner barrel 220 and the outer barrel 230 in a state of being insertedly fitted. The heating element 250 may be provided in a cylindrical shape with both end portions open, and may be insertedly fitted between surfaces of the inner barrel 220 and the outer barrel 230, the surfaces being parallel to the optical axis direction.

The heating element 250 may be connected to the substrate 290 by the power connection line 270 to receive power. The power connection line 270 may be extended from the heating element 250 exposed to the outside of the lens module 210, and may be connected to the connector 295 of the substrate 290 penetrating through the holder 280.

Figure 11A:
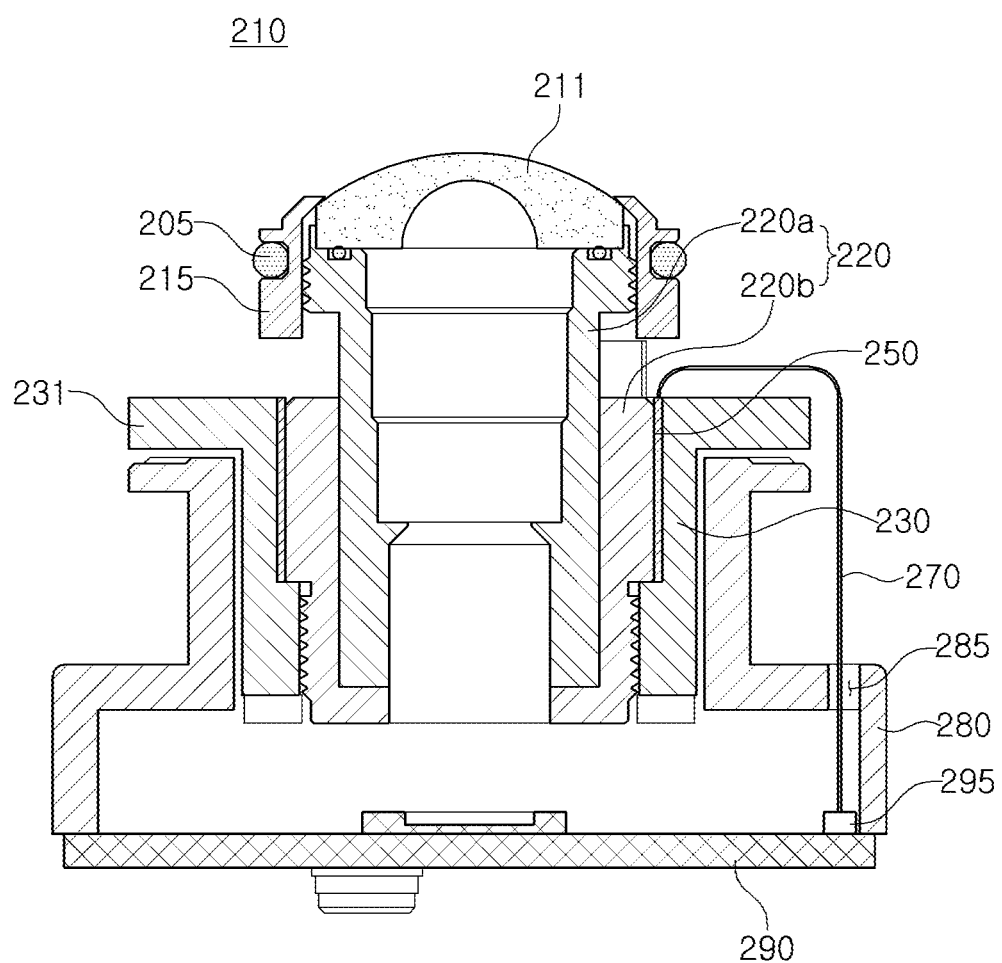
FIGS. 11A and 11B illustrate examples of assembled cross-sectional views of a lens module of the camera module of FIG. 7.

On the other hand, as illustrated in FIG. 11A, when the upper end portion of the heating element 250 is extended to upper surfaces of the inner barrel 220 and the outer barrel 230, facing each other in the optical axis direction, in other words, the uppermost end portion of the outer barrel 230, the power connection line 270 may be drawn-out between boundary surfaces of the inner barrel 220 and the outer barrel 230, facing each other in the optical axis direction.

Figure 11B:
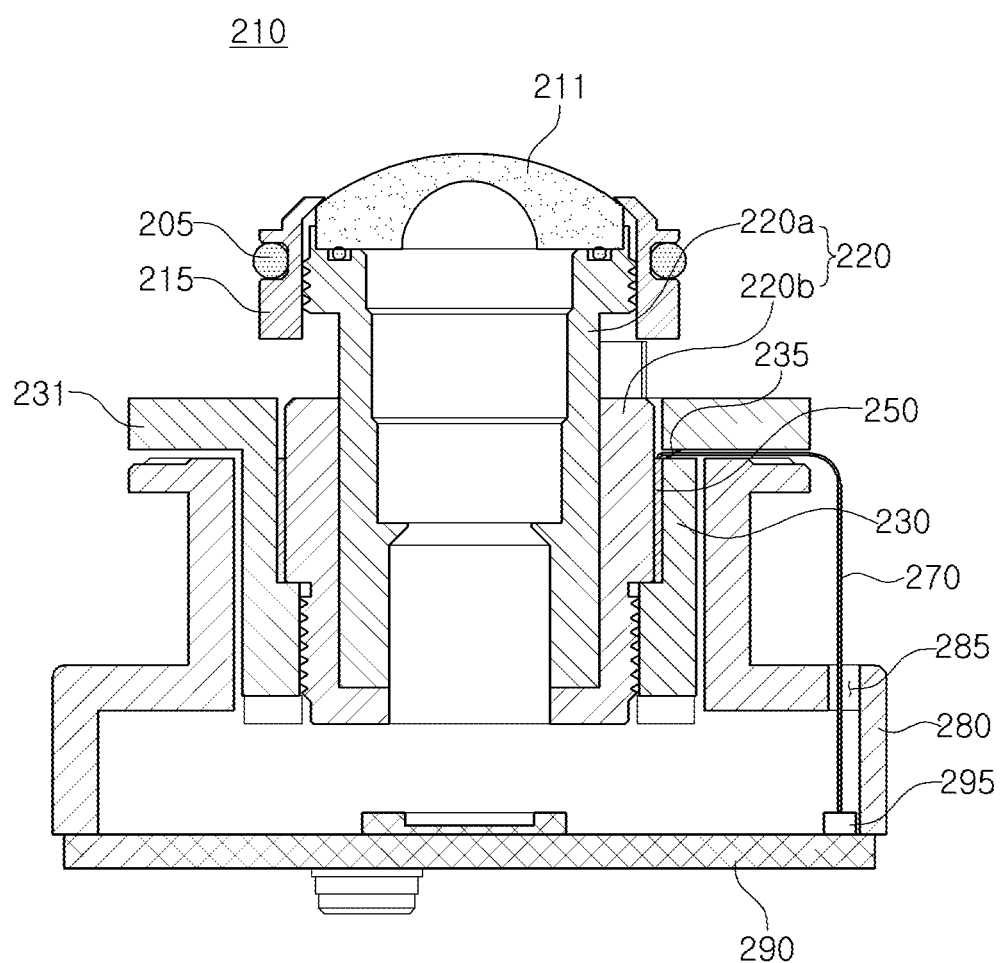

However, as illustrated in FIG. 11B, when the upper end portion of the heating element 250 does not extend to the uppermost end portion of the outer barrel 230, the power connection line 270 may be drawn out to the outside of the lens module 210 through a drawn-out hole 235 provided in the outer barrel 230.

The holder 280 may be fixedly coupled to the outer surface of the outer barrel 230. The upper end portion of the holder 280 may be hooked on a lower surface of the third coupling flange 231 of the outer barrel 230. The holder 280 and the outer barrel 230 may be fixed by screw-coupling or bonding-coupling using an adhesive. The thread may be provided to be mutually screw-coupled in the outer barrel 230 and the holder 280 for screw-coupling.

A coupling hole 285 may be provided such that the connector provided in the substrate 290 may be exposed in the holder 280. The power connection line 270 may be connected to the connector 295 through the coupling hole 285.

Further, the substrate 290 may be fixedly coupled to the lower portion of the holder 280. The substrate 290 may be screw-coupled or bonding-coupled with an adhesive such that the connector 295 is exposed through the coupling hole 285.

In the various examples, heating elements 150 and 250 may be provided in various ways. The heating elements 150 and 250 may be resistive elements which generate heat by the supply of current (power), and materials such as various metals, heat rays, ceramic Positive Temperature Coefficient (PTC), having resistance, may be implemented. Electrodes may be directly connected to the resistive elements or the resistive elements and electrodes may be laminated on the substrate. Hereinafter, an example will be described in detail with reference to FIGS. 12 and 13.

Figure 12:
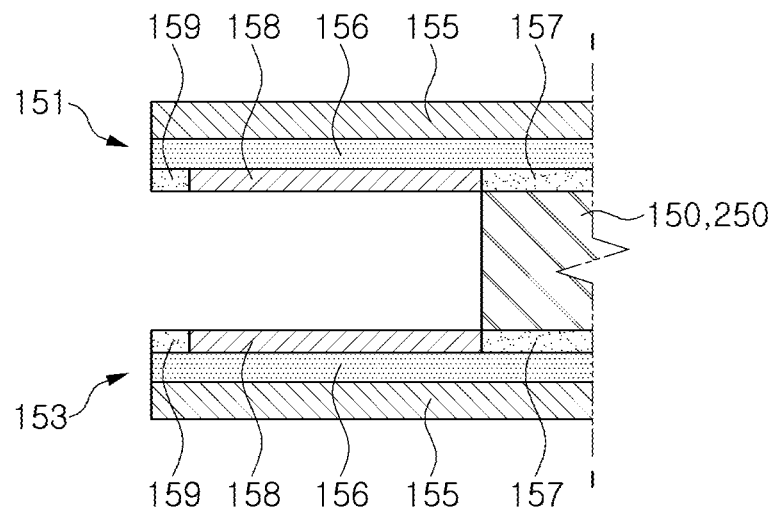
FIG. 12 illustrates an example of a partial cross-sectional view of an electrode coupled to a ceramic heating element.

Referring to FIG. 12, the heating elements 150 and 250 in the examples described herein may be provided in a ceramic type, and electrodes 151 and 153 for power supply may be provided on both sides of the heating elements 150 and 250. This is only an example, and electrodes may be provided on a single side of the heating elements 150 and 250.

The heating elements 150 and 250 may be a type of thermister or a baking ceramic type in which a positive temperature coefficient (PTC) having increased resistance according to a temperature is molded into a required shape. Electrodes 151 and 153 for power supply may be attached to both sides of the heating elements 150 and 250 for power supply. For example, as in the first example, when the heating element 150 is provided in a disk shape, the electrodes 151 and 153 may have roughly the same disk shape as the shape of the heating element 150. Further, when the heating element 250 is provided in a cylindrical shape as in the second example, the electrodes 151 and 153 may have roughly the same cylindrical shape as the shape of the heating element 250.

The electrodes 151 and 153 may have a drawn-out wire connectors 195 and 295 of respective substrates 190 and 290, and the drawn-out wires may be power connection lines 170 and 270.

As illustrated in FIG. 12, for example, a first electrode 151 and a second electrode 153 may include a base film 155, a copper layer 156 stacked on an upper portion of the base film 155, conductive layers 157 and 159 stacked on an upper portion of the copper layer 156 and a protective layer 158. The conductive layers 157 and 159 may include a heating element contact layer 157 which contacts the heating element and a terminal layer 159 which contacts the connector 195, and may be implemented by stacking a material that has relatively high conductivity such as gold plating, or a similar material. Additionally, the protective layer 158 may be formed of a film, or a similar material to protect the copper layer.

Figure 13:
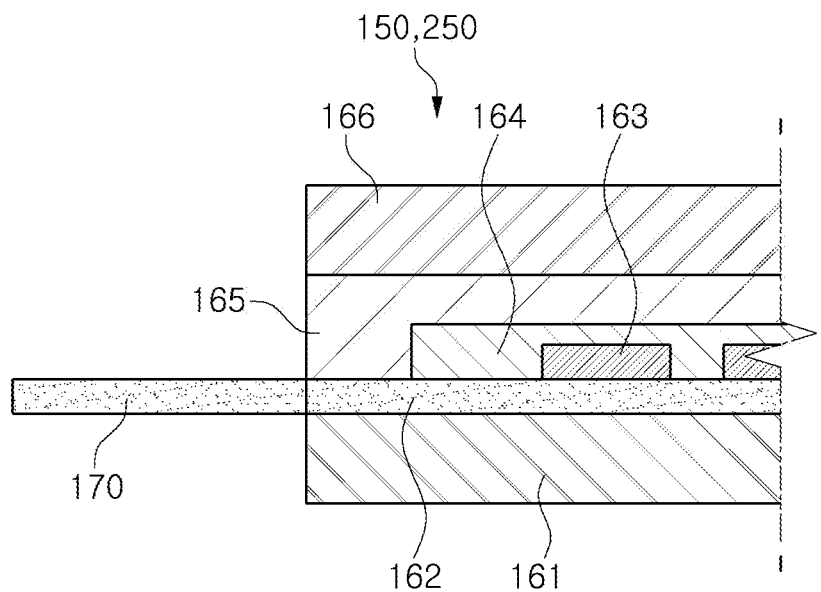
FIG. 13 illustrates an example of a partial cross-sectional view of a film-type heating element.

Referring to FIG. 13, heating elements 150 and 250 according to an example may be provided in a film-type substrate.

The heating elements 150 and 250 may be provided as a film-type substrate in which an ink, or a similar material including a heat generating material 163, is deposited or patterned on a film-type substrate 161. Here, the heat generating material 163 may be various metals, a heat ray, a ceramic positive temperature coefficient (PTC) having resistance, or a similar material. The PTC may be a type of thermister and may be a material in which the resistance increases according to temperature.

As illustrated in FIG. 13, for example, film-type heating elements 150 and 250 may include a base substrate 161, an electrode layer 162 stacked on an upper portion of the base substrate 161, a heat generating material 163 patterned in the electrode layer 162, a coating layer 164 stacked on an upper portion of the electrode layer 162 and the heat generating material 163, and an upper substrate 166 provided in an upper portion of the coating layer, and an adhesive layer 165 may be provided between the upper substrate 166 and the coating layer 164.

The electrode layer 162 may have drawn-out wires connected to the connectors 195 and 295 of the respective substrates 190 and 290, and the drawn-out wires may be power connection lines 170 and 270.

While the various examples have been particularly shown and described, a camera module according to the examples is not limited thereto.

As set forth above, according to an example, a camera module with improved performance may be provided since an outer shape and a size may not change and heat transfer may be efficiently transferred to a lens although a heater (or heating element) is added to a camera module.

Various examples provide a camera module in which the heating performance of a camera is improved while minimally changing the appearance of the camera.

In addition, in the present disclosure, since the power supply connection line of the heating element provided inside the lens barrel may be easily connected to the substrate, a manufacturing is simple and an assembly is easy.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   an upper housing coupled to a lower housing to form an inner space;
   a lens module provided in the inner space and comprising a heating element; and
   a substrate configured to supply power to the heating element,
   wherein the lens module comprises
      an inner barrel comprising one or more lenses,
      an outer barrel which is coupled to a portion of the inner barrel in an optical axis direction, and
      a holder in which the outer barrel is fixed;
   wherein the substrate is fixed to a portion of the holder,
   wherein the heating element is disposed between the inner barrel and the outer barrel, and is connected to the substrate by a power connection line,
   wherein the power connection line is connected to the substrate through a coupling hole in the holder, and
   wherein the power connection line is drawn out to an external region of the lens module.

2. The camera module according to claim 1, wherein the power connection line penetrates through the holder to be connected to the substrate.

3. The camera module according to claim 1, wherein the power connection line is drawn out to a boundary portion of the lens module at which the inner barrel and the outer barrel are coupled to each other.

4. The camera module according to claim 1, wherein the power connection line is drawn out to an external region of the lens module through a drawn-out hole provided in the outer barrel.

5. The camera module according to claim 1, wherein a connector to which the power connection line is coupled is provided on the substrate, and the connector is exposed to a coupling hole provided in the holder.

6. The camera module according to claim 1, wherein the heating element is formed in a disk shape, and is fitted between surfaces of the inner barrel and the outer barrel,
   wherein the surfaces of the inner barrel and the outer barrel face each other in the optical axis direction.

7. The camera module according to claim 1, wherein the heating element is formed in a cylindrical shape, and is fitted between surfaces of the inner barrel and the outer barrel, and
   wherein the surfaces of the inner barrel and the outer barrel are parallel to the optical axis direction.

8. The camera module according to claim 1, wherein the heating element is formed in a ceramic type in which heating materials are mixed and baked.

9. The camera module according to claim 8, wherein the heating element is configured to have two electrodes on both sides of the heating element or two electrodes on one side of the heating element.

10. The camera module according to claim 9, wherein the power connection line is extended from the two electrodes.

11. The camera module according to claim 1, wherein the heating element is provided in a film-type heating element in which a heating material is deposited or patterned on a film-type substrate.

12. The camera module according to claim 11, wherein the heating element is configured to have two electrodes.

13. The camera module according to claim 12, wherein the power connection line is extended from the two electrodes.

14. The camera module according to claim 1, wherein the heating element is formed from a positive temperature coefficient (PTC) material.

15. The camera module according to claim 1, wherein the inner barrel is formed from a metal material which has a relatively high thermal conductivity.

16. The camera module according to claim 1, wherein the inner barrel is formed from aluminum.

17. The camera module according to claim 6, wherein the heating element is exposed to an external region of the lens module.

18. A camera module comprising:
   a lens module comprising
      an inner barrel;
      an outer barrel;
      a heating element disposed between the inner barrel and the outer barrel; and
      a power-supply connection line configured to be drawn out of the lens module to be disposed in a location that is external to the outer barrel to connect the heating element to a power supply source;
      wherein the power-supply connection line is drawn out to an external region of the lens module.

19. The camera module of claim 18, wherein the power connection line is external to the lens module.

20. The camera module of claim 18, wherein the heater is one of a disk shape or a cylindrical shape.

\* \* \* \* \*